United States Patent
Takeda et al.

(10) Patent No.: US 9,568,731 B2
(45) Date of Patent: Feb. 14, 2017

(54) VIRTUAL IMAGE DISPLAY DEVICE

(71) Applicant: SEIKO EPSON CORPORATION, Tokyo (JP)

(72) Inventors: Takashi Takeda, Suwa (JP); Takahiro Totani, Suwa (JP); Masayuki Takagi, Matsumoto (JP); Akira Komatsu, Tatsuno-machi (JP); Toshiaki Miyao, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 180 days.

(21) Appl. No.: 14/164,530

(22) Filed: Jan. 27, 2014

(65) Prior Publication Data

US 2014/0247500 A1 Sep. 4, 2014

(30) Foreign Application Priority Data

Mar. 4, 2013 (JP) ................. 2013-041587

(51) Int. Cl.
*G02B 27/01* (2006.01)
*G02B 6/00* (2006.01)

(52) U.S. Cl.
CPC ............ *G02B 27/0172* (2013.01); *G02B 6/00* (2013.01); *G02B 2027/012* (2013.01); *G02B 2027/0116* (2013.01); *G02B 2027/0121* (2013.01)

(58) Field of Classification Search
CPC .................. G02B 27/017; G02B 2027/012
USPC ........................................ 359/630
See application file for complete search history.

(56) References Cited

U.S. PATENT DOCUMENTS

| | | | |
|---|---|---|---|
| 5,912,769 A | 6/1999 | Iizuka et al. | |
| 6,049,429 A | 4/2000 | Iizuka et al. | |
| 6,124,977 A | 9/2000 | Takahashi | |
| 6,396,639 B1 | 5/2002 | Togino et al. | |
| 6,441,978 B1 | 8/2002 | Kobayashi et al. | |
| 6,646,809 B1 | 11/2003 | Ishino et al. | |
| 7,577,326 B2 * | 8/2009 | Amitai ................. | G02B 6/0028 359/636 |
| 9,116,342 B2 * | 8/2015 | Totani ................. | G02B 27/0172 |
| 2002/0105738 A1 | 8/2002 | Kobayashi et al. | |
| 2012/0200935 A1 | 8/2012 | Miyao et al. | |
| 2012/0206817 A1 * | 8/2012 | Totani ................. | G02B 27/0172 359/633 |
| 2012/0243102 A1 | 9/2012 | Takeda et al. | |
| 2013/0182317 A1 | 7/2013 | Takahashi | |
| 2016/0116744 A1 | 4/2016 | Takeda et al. | |

FOREIGN PATENT DOCUMENTS

JP    H09-73005 A    3/1997
JP    H10-268114 A    10/1998
(Continued)

*Primary Examiner* — Zachary Wilkes
(74) *Attorney, Agent, or Firm* — Oliff PLC

(57) ABSTRACT

A light guide member which guides video light includes a peripheral area forming portion extending to the outside of an effective light flux guide portion which is an area through which an effective light flux of the video light passes, and thus for example, even when ghost light resulting from components generated by unintended reflection or scattering in a position such as a side surface forming portion of the light guide member may be generated, the side surface forming portion can be separated from the effective light flux guide portion.

14 Claims, 9 Drawing Sheets

(56) References Cited

FOREIGN PATENT DOCUMENTS

| | | |
|---|---|---|
| JP | H11-142783 A | 5/1999 |
| JP | 2001-033729 A | 2/2001 |
| JP | A-2002-118799 | 4/2002 |
| JP | 2006-153967 A | 6/2006 |
| JP | 2012-058302 A | 3/2012 |
| JP | 2012-163656 A | 8/2012 |
| JP | 2012-198392 A | 10/2012 |

* cited by examiner

VIRTUAL IMAGE DISPLAY DEVICE

BACKGROUND

1. Technical Field

The present invention relates to a virtual image display device which presents a video formed by an image display element or the like to an observer, and particularly, to a virtual image display device suitable for a head-mounted display which is mounted on a head of the observer.

2. Related Art

Various systems have been proposed as an optical system which is incorporated in a virtual image display device such as a head-mounted display (hereinafter, also referred to as HMD) which is mounted on a head of an observer. (for example, JP-A-2002-116799).

As for virtual image display devices such as an HMD, it is desirable to increase an angle of view of video light and to reduce a device weight. Particularly, it is important to reduce a thickness in a visual axis direction of an observer and to move the center of gravity closer to the observer, in order to improve a fit.

When a field of view of an observer is completely covered and only video light is thus viewed, the observer cannot grasp a state of an external world, and thus uneasiness is caused. Furthermore, a new use such as virtual reality is generated by showing an external world and a video in a superimposed manner. Therefore, it is desirable to use displays which display video light in a superimposed manner without disturbing the field of view of the external world.

In virtual image display devices, it is necessary to prevent the generation of ghost light resulting from video light and the like, in order to visually recognize a good image and an external image. Particularly, when a see-through function for displaying external light and video light in a superimposed manner is provided, ghost light may be generated due to not only the video light, but also the external light, and thus a countermeasure for ghosting is more important. Furthermore, it is thought that when trying to secure optical paths of the external light and the video light under the circumstance where the devices have a form similar to glasses and are reduced in size, a position where ghost light is generated is formed even by, for example, a slight optical path deviation which is caused by an error of the product. Furthermore, it is also thought that an observer moves the direction of eyes to see an external world in a see-through mode. In this case, the observer may not see ghost light when seeing an image from the front, but may see the ghost light when moving the direction of eyes.

For example, JP-A-2002-118799 proposes that a frame-like light-shielding member is provided so that flare light and ghost light do not reach eyes of an observer. However, when the light-shielding member is provided as in the case of JP-A-2002-118799, necessary light may be blocked according to alignment upon arrangement, and ghost light may be generated due to components reflected on a side surface of the light-shielding member. Particularly, when a see-through function for displaying external light and video light in a superimposed manner is provided, it is also necessary to consider the occurrence of ghosting by the external light, in order to suppress the generation of the ghost light. Thus, the countermeasure for ghosting using the light-shielding member may be insufficient.

SUMMARY

An advantage of some aspects of the invention is to provide a virtual image display device which has a see-through function for displaying external light and video light in a superimposed manner and can suppress the generation of ghost light.

An aspect of the invention is directed to a virtual image display device, which allows video light and external light to be visually recognized at the same time, including a video element which generates video light, and a light guide member which has a plurality of surfaces and guides the video light from the video element through reflection and transmission on the plurality of surfaces, in which the light guide member has an effective light flux guide portion which guides effective light flux components which reach an observer as the video light from the video element, and a peripheral area forming portion which is formed around the effective light flux guide portion.

In the virtual image display device, in the light guide member which guides video light, the peripheral area forming portion is provided around the effective light flux guide portion, and thus it is possible to prevent the formation of a position where unnecessary light is generated by unintended reflection or scattering, such as a boundary portion of the effective light flux guide portion. In addition, when the effective light flux guide portion or the peripheral area forming portion is provided by the light guide member, a position in which unnecessary light may be generated, such as a side surface forming portion which does not contribute to guiding in the light guide member, can be separated from the effective light flux guide portion. That is, the generation of ghost light resulting from unnecessary light can be reduced by providing the peripheral area forming portion in an interposed manner. Accordingly, even under the circumstance where the video light and the external light are visually recognized at the same time, the possibility of the generation of ghost light resulting from unnecessary light can be reduced, and thus good video light can be visually recognized and a good external image can also be recognized.

In a specific aspect of the invention, the light guide member is a prism-type member which guides the video light from the video element and allows the external light to pass therethrough. In this case, the prism as the light guide member has light permeability and allows not only guiding of video light, but also passage of external light to realize a see-through mode. In addition, in this case, in the prism, the effective light flux guide portion and the peripheral area forming portion are formed to avoid the generation of ghost light resulting from unnecessary light in the prism while realizing the see-through mode, and to securely propagate effective components.

In another specific aspect of the invention, the peripheral area forming portion allows unnecessary incident light to pass therethrough and guides the light in a direction in which it departs from a range which can be visually recognized by the observer. In this case, since the peripheral area forming portion is provided, a space where unnecessary light is eliminated can be secured.

In another specific aspect of the invention, the effective light flux guide portion has an effective light flux guide surface which guides video light, and the peripheral area forming portion has an expanded surface provided to enlarge the effective light flux guide surface. In this case, the peripheral area forming portion has an expanded surface which is formed by enlargement from the effective light flux guide surface, and thus unnecessary light which enters the light guide member can be guided in a direction in which it departs from a range of a visual field which can be visually recognized by the observer.

In another specific aspect of the invention, in the peripheral area forming portion, the expanded surface is a continuous surface peripherally continuously extending from the effective light flux guide surface.

In another specific aspect of the invention, the peripheral area forming portion includes, as the expanded surface, a surface where the effective light flux guide surface is enlarged in a light guide direction.

In another specific aspect of the invention, among the surfaces constituting the light guide member, the expanded surface has a greater roughness than that of the effective light flux guide surface. In this case, it is not required to adjust the roughness of the expanded surface as strictly as the roughness of the effective light flux guide surface, and thus a mold for molding the light guide member can be relatively easily produced and the virtual image display device can be easily produced.

In another specific aspect of the invention, the light guide member has a side surface forming portion which forms a side surface area which is a part of the plurality of surfaces and does not contribute to guiding of video light, and the peripheral area forming portion is formed to be interposed between the effective light flux guide portion and the side surface forming portion. In this case, the side surface forming portion which easily generates unnecessary light can be separated from the effective light flux guide portion by providing the peripheral area forming portion in an interposed manner.

In another specific aspect of the invention, in the light guide member, the side surface area of the side surface forming portion is constituted by a glossy surface. In this case, light diffusion is suppressed in the side surface area to reduce the generation of ghosting.

In another specific aspect of the invention, in the light guide member, a surface including the side surface area of the side surface forming portion is formed to be smoothed by hard coating. In this case, the whole surface of the light guide member can be relatively easily smoothed with a high accuracy by hard coating.

In another aspect of the invention, the light guide member has such a surface roughness that a maximum valley depth Pv of a cross-sectional curve is 50 μm or less and a center line average roughness Ra is 5 μm or less. In this case, unnecessary light components can be reflected without being diffused on the reflective surface, and thus the generation of ghost light can be reduced.

In another specific aspect of the invention, the light guide member includes three or more non-axisymmetric curved surfaces and allows an intermediate image to be formed in the effective light flux guide portion as a part of the optical system which guides video light. In this case, it is possible to reduce the whole optical system in size and weight and to realize the bright, high-performance display with a large angle of view.

In another specific aspect of the invention, the peripheral area forming portion is provided around a portion in which an intermediate image is formed at least in the effective light flux guide portion. In this case, unnecessary light components such as ambient light are prevented from approaching a portion which is positioned ahead of and behind the intermediate image, in which an effective light flux is converged, in the peripheral area forming portion, and thus the occurrence of ghosting due to an influence of the unnecessary light components on the effective light flux can be suppressed.

In another specific aspect of the invention, in the light guide member, when external light is visually recognized after passing a first surface and a third surface among the plurality of surfaces, the diopter is approximately 0, the first surface and the third surface form a concave shape with respect to an observation side, and the video light from the video element is totally reflected on the third surface, totally reflected on the first surface, and reflected on a second surface, and then passes through the first surface to reach the observation side. In this case, the diopter is approximately 0, and thus good external light can be visually recognized without distortion. In addition, a shape along a face of the observer is obtained by forming the concave shape and the center of gravity is close to the face, whereby an excellent design can be obtained.

In another specific aspect of the invention, the light guide member has a fourth surface which is disposed adjacent to a light incidence side of the first surface and guides video light incident thereinto to the third surface, a fifth surface which is disposed adjacent to a light incidence side of the third surface and guides video light incident thereinto to the fourth surface, and a sixth surface which allows the video light from the video element to be incident thereinto and guides the light to the fifth surface, the fourth surface is a reflective surface which extends into a convex shape in the light guide direction from the sixth surface, and is a surface which totally reflects the light reflected on the fifth surface to the inside of the light guide portion through total reflection, and the peripheral area forming portion is provided around the fourth surface.

In another specific aspect of the invention, in the light guide member, a surface which forms a front side of the device among the plurality of surfaces is wider than a surface which forms a rear side. In this case, a shape which is easily matched with a face of the observer is obtained.

BRIEF DESCRIPTION OF THE DRAWINGS

The invention will be described with reference to the accompanying drawings, wherein like numbers reference like elements.

FIG. 53 is a diagram showing an aspect in which the ghost light is not visually recognized when viewed from front.

DESCRIPTION OF EXEMPLARY EMBODIMENTS

First Embodiment

Hereinafter, a virtual image display device of a first embodiment according to the invention will be described in detail with reference to the drawings.

A. External Appearance of Virtual Image Display Device

Figure 1:
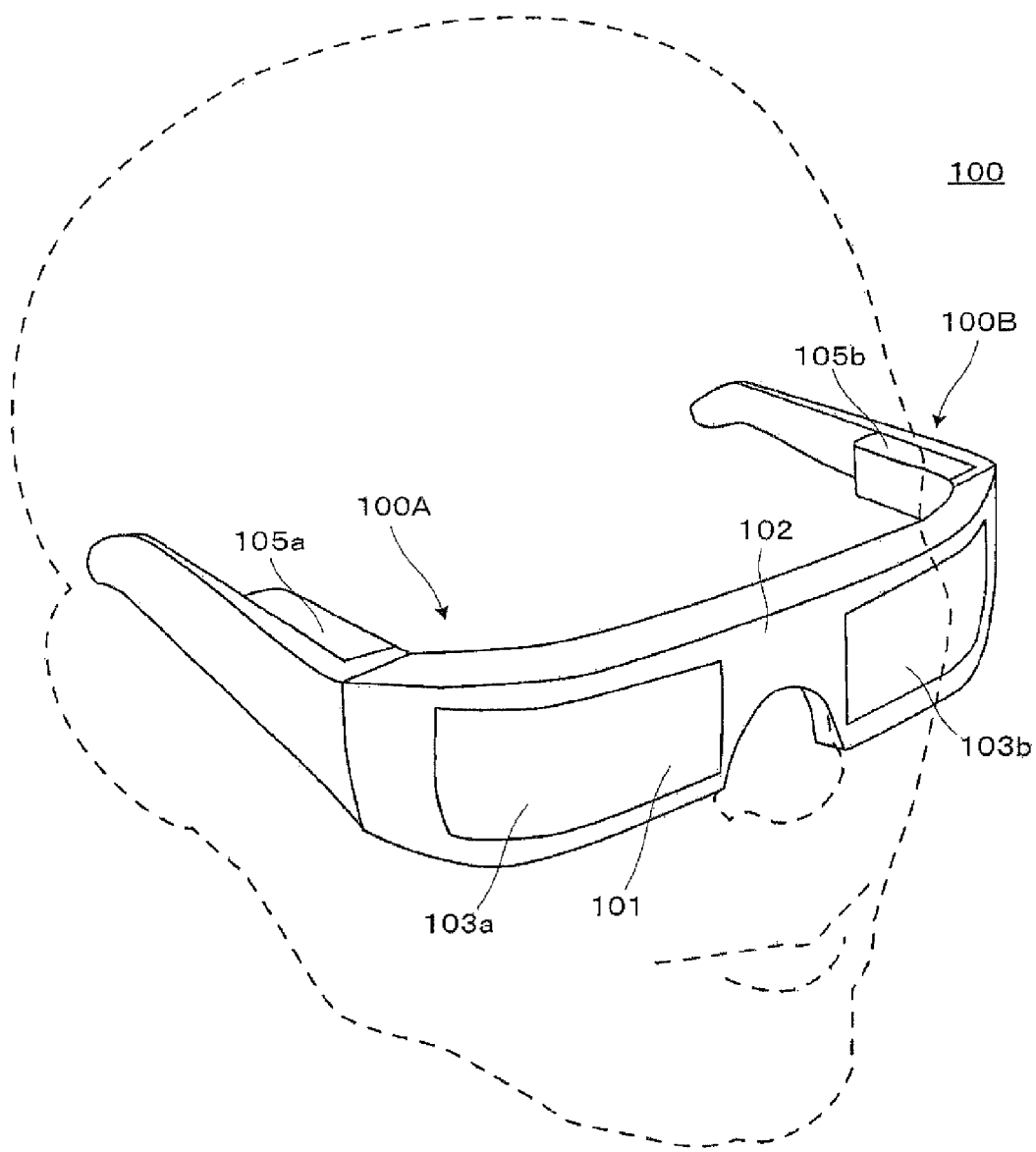
FIG. 1 is a perspective view illustrating an external appearance of a virtual image display device of a first embodiment.

A virtual image display device 100 of this embodiment shown in FIG. 1 is a head-mounted display having an external appearance like glasses. The virtual image display device 100 can allow an observer wearing the virtual image display device 100 to visually recognize image light corresponding to a virtual image and allow the observer to visually recognize or observe an external image in a see-through manner. The virtual image display device 100 includes a see-through member 101 which covers the front of eyes of the observer, a frame 102 which supports the see-through member 101, and first and second built-in device portions 105a and 105b which are installed in portions ranging from cover portions at both right and left ends of the frame 102 to rear temple portions, respectively. Here, the see-through member 101 is a curved thick optical member (transmissive eye cover) which covers the front of eyes of the observer, and is divided into a first optical portion 103a and a second optical portion 103b. A first display device 100A on the left side in the drawing, in which the first optical portion 103a and the first built-in device portion 105a are combined, is a portion which forms a virtual image for a right eye, and functions as a virtual image display device independently. In addition, a second display device 100B on the right side in the drawing, in which the second optical portion 103b and the second built-in device portion 105b are combined, is a portion which forms a virtual image for a left eye, and functions as a virtual image display device independently.

B. Structure of Display Device

Figure 2A:
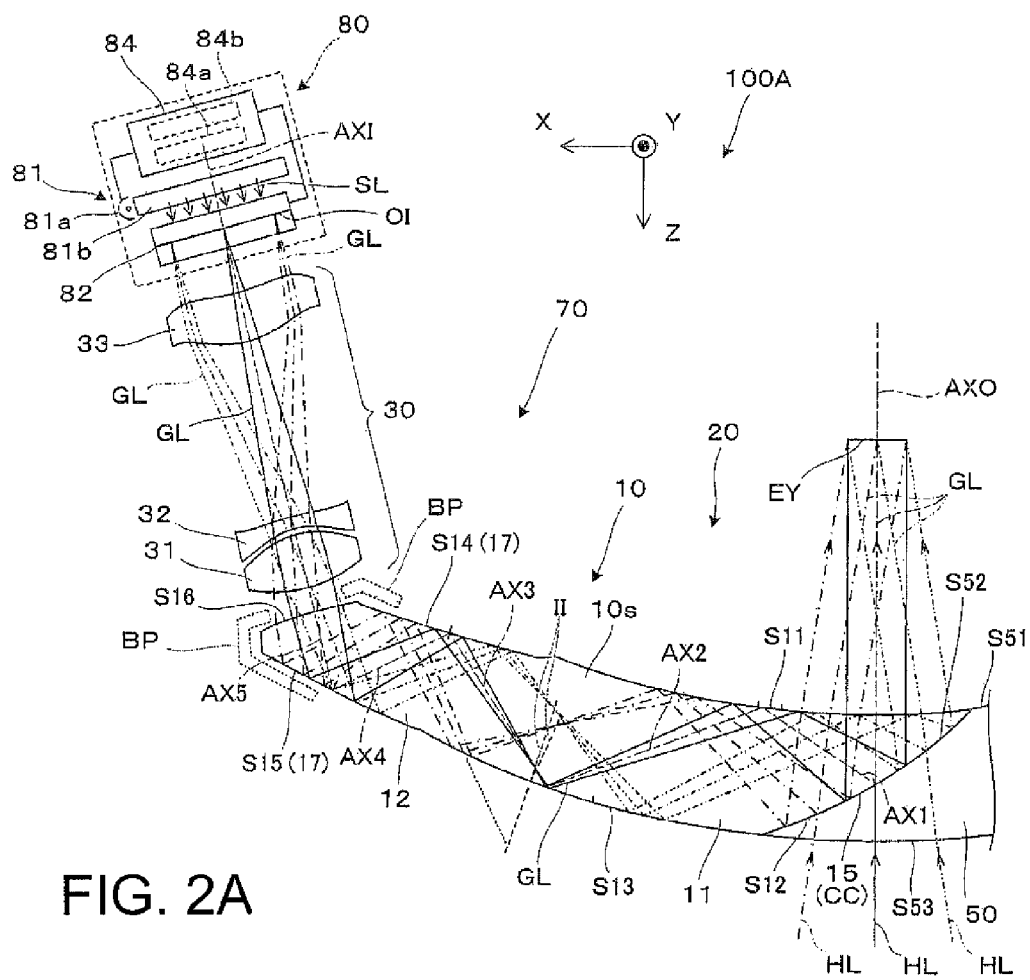
FIG. 2A is a cross-sectional view of a main body portion of a first display device constituting the virtual image display device when viewed from above.

As shown in FIGS. 2A and 22 and the like, the first display device 100A includes a projection/see-through device 70 and an image display device 80. The projection/see-through device 70 includes a light guide member 10 which is a prism-type member, a light transmission member 50, and a projection lens 30 for imaging. The light guide member 10 and the light transmission member 50 are formed integrally with each other by bonding, and are firmly fixed to the lower side of a frame 61 so that for example, an upper surface 10e of the light guide member 10 and a lower surface 61e of the frame 61 are brought into contact with each other. More specifically, the light guide member 10 has a mounting portion 10g formed to enable mounting on the frame 61 and is, for example, screw-fastened to a mounting portion 61g extending to correspond to the mounting portion 10g from the frame 61. The projection lens 30 is fixed to an end portion of the light guide member 10 via a lens tube 62 storing the projection lens in an engaged manner. In addition, the projection lens 30 is firmly fixed to the lower side of the frame 61. A light guide device 20 is configured by connecting (bonding) the light guide member 10 to the light transmission member 50 in the projection/see-through device 70. The light guide device 20 corresponds to the first optical portion 103a in FIG. 1. The projection lens 30 of the projection/see-through device 70 and the image display device 80 correspond to the first built-in device portion 105a in FIG. 1. Since the second display device 100B shown in FIG. 1 has a similar structure to the first display device 100A, except for horizontal inversion, the detailed description of the second display device 100B will be omitted.

Figure 2B:
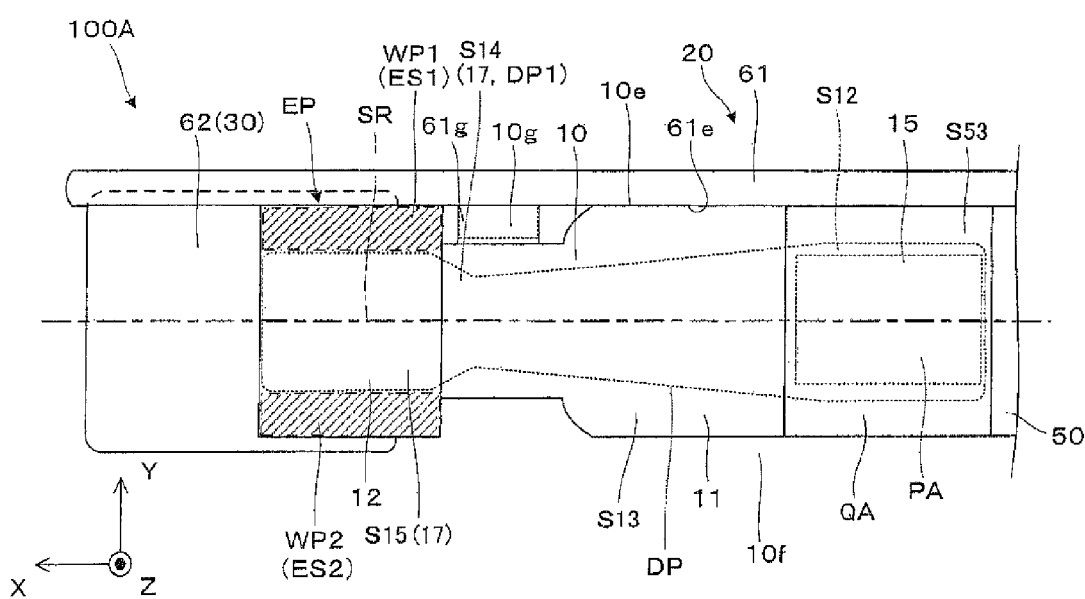
FIG. 2B is a front view of the main body portion.

In the projection/see-through device 70, the light guide member 10 which is a prism-type member is an arc-like member curved along a face when viewed from above, and can be considered by division into a first prism portion 11 on the central side close to a nose and a second prism portion 12 on the peripheral side separated from the nose. The first prism portion 11 is disposed on the light emission side and has a first surface S11, a second surface S12, and a third surface S13 as side surfaces having an optical function. The second prism portion 12 is disposed on the light incidence side and has a fourth surface S14, a fifth surface S15, and a sixth surface S16 as side surfaces having an optical function. Among these, the first surface S11 is adjacent to the fourth surface S14 and the third surface 313 is adjacent to the fifth surface S15. The second surface 312 is disposed between the first surface S11 and the third surface 313 and the sixth surface S16 is disposed between the fourth surface S14 and the fifth surface S15. The light guide member 10 has expanded surfaces ES1 and ES2 which are provided by extending at least one of the surfaces S11 to S16 each including a non-axisymmetric curved surface having the above-described optical function. This will be described later in detail. Here, for example, as shown in FIG. 2B, the expanded surfaces ES1 and ES2 which are provided by extension from the fourth surface S14 are formed by wall portions WP1 and WP2. In addition, the light guide member 10 has a first side surface 10e and a second side surface 10f which are adjacent to the first to sixth surfaces S11 to S16 and are opposed to each other. These side surfaces 10e and 10f are surfaces which do not have an optical function during light guiding, differently from the surfaces S11 to S16.

In the light guide member 10, the first surface S11 is a free curved surface in which an emission-side optical axis AXO parallel to the Z axis is set as a central axis or a reference axis. The second surface S12 is a free curved surface in which an optical axis AX1 which is included in a reference surface SR parallel to the X-Z surface and inclined with respect to the Z axis is set as a central axis or a reference axis. The third surface S13 is a free curved surface in which the emission-side optical axis AXO is set as a central axis or a reference axis. The fourth surface S14 is a free curved surface in which a bisector of a pair of optical axes AX3 and AX4 which is included in the reference surface SR parallel to the X-Z surface and inclined with respect to the Z axis is set as a central axis or a reference axis. The fifth surface S15 is a free curved surface in which a bisector of a pair of optical axes AX4 and AX5 which is included in the reference surface SR parallel to the X-Z surface and inclined with respect to the Z axis is set as a central axis or a reference axis. The sixth surface S16 is a free curved surface in which the optical axis AX4 which is included in the reference surface SR parallel to the X-Z surface and inclined with respect to the Z axis is set as a central axis or a reference axis. The above first to sixth surfaces S11 to S16 are shaped to be symmetrical to each other around the vertical (or longitudinal) Y-axis direction with the reference surface SR, which extends horizontally (or transversely) and is parallel to the X-Z surface and through which the optical axes AX1 to AX4 and the like pass, interposed therebetween.

The light guide member (prism) 10 is made from a resin material exhibiting high light permeability in a visible range and is molded by injecting a thermoplastic resin into a mold and solidifying the thermoplastic resin. A main body portion 10s of the light guide member 10 is an integrally molded product. However, it can be considered by division into the first prism portion 11 and the second prism portion 12. The first prism portion 11 enables guiding and emission of video light GL and transmission of external light HL. The second prism portion 12 enables incidence and guiding of the video light GL.

In the first prism portion 11, the first surface S11 functions as a refractive surface from which the video light GL is emitted to the outside of the first prism portion 11, and also functions as a total reflective surface from which the video light GL is totally reflected on the inner surface side thereof. The first surface S11 is disposed in front of an eye EY, and has a concave shape with respect to an observer. The first surface S11 may be coated on the main body portion 10s with a hard coating layer in order to prevent surface damage and image resolution reduction. The hard coating layer is formed by applying a coating agent formed of a resin or the like to a base surface of the main body portion 10s by a dipping process or a spray coating process.

The second surface S12 includes a half mirror layer 15. The half mirror layer 15 is a reflective film (that is, a semi-transmissive reflective film) having light permeability. The half mirror layer (the semi-transmissive reflective film) 15 is not formed on the overall area of the second surface S12, but is formed on a partial area PA thereof. That is, the half mirror layer 15 is formed on the partial area PA obtained by mainly narrowing an overall area QA in which the second surface S12 is enlarged in a vertical direction. More specifically, the partial area PA is disposed on the central side in the vertical Y axis direction and is disposed approximately throughout in a direction along the horizontal reference surface SR. The half mirror layer 15 is formed by forming a metal reflective film or a dielectric multilayer film on the partial area PA of the base surface of the main body portion 10s. The reflectance of the half mirror layer 15 to the video light GL is set to the range from 10% to 50% in an expected incident angle range of the video light GL from the viewpoint of ease of observation of the external light HL in a see-through manner. According to a specific example, the reflectance of the half mirror layer 15 to the video light GL is set to 20%, for example, and the transmittance of the video light GL is set to 80%, for example.

The third surface S13 functions as a total reflective surface from which the video light GL is totally reflected on the inner surface side thereof. The third surface S13 may be coated on the main body portion 10s with a hard coating layer in order to prevent surface damage and image resolution reduction. The third surface S13 is disposed in front of the eye EY, and has a concave shape with respect to the observer similarly to the first surface S11. When the external light HL is viewed after passing through the first surface S11 and the third surface S13, the diopter is approximately 0.

In the second prism portion 12, the fourth surface S14 and the fifth surface S15 each function as a total reflective surface from which the video light GL is totally reflected on the inner surface side thereof, or are coated with a mirror layer 17 and function as a reflective surface. The fourth surface S14 is a reflective surface extending into a convex shape in a light guide direction from the sixth surface S16 which is a light-incident surface of the video light GL to be described later. When the fourth surface S14 and the fifth surface S15 function as the total reflective surfaces, the main body portion 10s may be coated with a hard coating layer in order to prevent surface damage and image resolution reduction.

The sixth surface S16 functions as a refractive surface which allows the video light GL to enter the second prism portion 12. The sixth surface S16 may be coated on the main body portion 10s with a hard coating layer in order to prevent surface damage and image resolution reduction, and the main body portion 10s may be coated with a multilayer film in order to suppress ghosting by reflection prevention.

The light transmission member 50 is integrally fixed to the light guide member 10. The light transmission member 50 is a member (auxiliary prism) which supports the see-through function of the light guide member (prism) 10, and has a first transmission surface S51, a second transmission surface S52, and a third transmission surface S53 as side surfaces having an optical function. Here, the second transmission surface S52 is disposed between the first transmission surface S51 and the third transmission surface S53. The first transmission surface S51 is disposed on a curved surface extending from the first surface S11 of the light guide member 10, the second transmission surface S52 is a curved surface which is bonded to the second surface S12 with an adhesive CC to be integrated therewith, and the third transmission surface S53 is disposed on a curved surface extending from the third surface S13 of the light guide member 10. Among these, the second transmission surface S52 and the second surface 312 of the light guide member 10 are formed integrally with each other by bonding, and thus the second transmission surface S52 and the second surface S12 are shaped to have approximately the same curvature.

The light transmission member (auxiliary prism) 50 is made from a resin material which exhibits high light permeability in a visible range and has approximately the same refractive index as that of the main body portion 10s of the light guide member (prism) 10. The light transmission member 50 is formed by molding of, for example, a thermoplastic resin.

The projection lens 30 is retained in the lens tube 62, and the image display device 80 is fixed to an end of the lens tube 62. The second prism portion 12 of the light guide member 10 is connected to the lens tube 62 which retains the projection lens 30 and indirectly supports the projection lens and the image display device 80. An additional light-shielding portion BP which prevents external light from entering the light guide member 10 may be provided around the light guide member 10 as shown by the broken line in FIG. 2A. The light-shielding portion BP may be constituted by, for example, a light-shielding coating or a light-scattering layer, and thus can previously remove unnecessary light components when video light enters from the projection lens 30 to the light guide member 10. The light-shielding portion BP is provided so that the passage of a light flux which is necessary light among video light is not disturbed or new unnecessary light components are not formed by unintended reflection. The position shown in the drawing, at which the light-shielding portion BP is formed, is just an example, and the light-shielding portion BP may be appropriately provided at a different position.

The projection lens 30 includes, for example, three lenses 31, 32, and 33 along an incidence-side optical axis AXI. The respective lenses 31, 32, and 33 are axisymmetric lenses, and at least one thereof has an aspheric surface. The projection lens 30 allows the video light GL emitted from the image display device 80 to enter the light guide member 10 through the sixth surface S16 of the light guide member 10 for re-imaging. That is, the projection lens 30 is a relay optical system for re-imaging the video light or the image light emitted from each point on an image surface (display position) OI of a video display element 82 in the light guide member 10. Each surface of the light guide member 10 functions as a part of the relay optical system in cooperation with the projection lens 30.

The image display device 80 has an illumination device 81 which emits two-dimensional illumination light SL, the video display element 82 which is a transmissive spatial light modulation device, and a driving control portion 84 which controls operations of the illumination device 81 and the video display element 82.

The illumination device 81 of the image display device 80 has a light source 81a which generates light including three colors of red, green, and blue, and a backlight guide portion Sib which diffuses the light from the light source 81a and converts the light into a light flux having a rectangular cross-section. The video display element 82 is a video element formed by a liquid crystal display device, for example, and spatially modulates the illumination light SL from the illumination device 81 to form image light which is an object to be displayed, such as a moving picture. The driving control portion 84 includes a light source driving circuit 84a and a liquid crystal driving circuit 84b. The light source driving circuit 84a supplies electric power to the light source 81a of the illumination device 81 and emits the illumination light SL with stable luminance. The liquid crystal driving circuit 84b outputs an image signal or a driving signal to the video display element (video element) 82 to form color image light which is a basis of a moving picture or a still image as a transmittance pattern. In addition, the liquid crystal driving circuit 84b may be provided with an image processing function, but the image processing function may be provided in a control circuit which is externally attached.

C. Optical Path of Video Light or the Like

Hereinafter, an optical path of the video light GL or the like in the virtual image display device 100 will be described.

The video light GL emitted from the video display element (video element) 82 enters the sixth surface S16 having relatively strong positive refractive power provided in the light guide member 10 while being converged by the projection lens 30.

The video light GL passing through the sixth surface S16 of the light guide member 10 advances while being converged. When passing through the second prism portion 12, the video light GL is reflected on the fifth surface S15 having relatively weak positive refractive power, and is reflected on the fourth surface S14 having relatively weak negative refractive power.

The video light GL reflected on the fourth surface S14 of the second prism portion 12 enters the third surface S13 having relatively weak positive refractive power to be totally reflected thereon in the first prism portion 11, and enters the first surface S11 having relatively weak negative refractive power to be totally reflected thereon. The video light GL forms an intermediate image in the light guide member 10 before and after passing through the third surface S13. An image surface II of the intermediate image corresponds to the image surface (display position) OI of the video display element 82, but is turned back on the third surface S13.

The video light GL which is totally reflected on the first surface S11 enters the second surface S12, but particularly, the video light GL entering the half mirror layer 15 is partially reflected while partially passing through the half mirror layer 15, and enters again the first surface S11 to pass therethrough. The half mirror layer 15 has relatively strong positive refractive power with respect to the reflected video light GL. The first surface S11 has negative refractive power with respect to the video light GL passing therethrough.

The video light GL passing through the first surface S11 enters a pupil of the eye EY of the observer as an approximately parallel light flux. That is, the observer observes the image formed on the video display element 82 by the video light GL as a virtual image.

External light HL entering a side in the +X direction rather than the second surface S12 of the light guide member 10 passes through the third surface S13 and the first surface S11 of the first prism portion 11. At this time, positive and negative refractive powers cancel out, and aberration is corrected. That is, the observer observes an external image having less distortion through the light guide member 10. Similarly, when external light HL entering a side in the −X direction rather than the second surface S12 of the light guide member 10, that is, light entering the light transmission member 50 passes through the third transmission surface S53 and the first transmission surface S51 provided therewith, positive and negative refractive powers cancel out, and aberration is corrected. That is, the observer observes an external image having less distortion through the light transmission member 50. Furthermore, when external light HL entering the light transmission member 50 corresponding to the second surface S12 of the light guide member 10 passes through the third transmission surface S53 and the first surface S11, positive and negative refractive powers cancel out, and aberration is corrected. That is, the observer observes an external image having less distortion through the light transmission member 50. The second surface S12 of the light guide member 10 and the second transmission surface S52 of the light transmission member 50 have approximately the same curved surface shapes and have approximately the same refractive indexes, and a gap therebetween is filled with the adhesive layer (adhesive) CC having approximately the same refractive index. That is, the second surface S12 of the light guide member 10 or the second transmission surface S52 of the light transmission member 50 does not act as refractive surfaces with respect to the external light HL.

However, since the external light HL entering the half mirror layer 15 is partially reflected while partially passing through the half mirror layer 15, the external light HL in a direction corresponding to the half mirror layer 15 is weakened due to the transmittance of the half mirror layer 15. On the other hand, since video light GL enters in the direction corresponding to the half mirror layer 15, the observer observes the image formed on the video display element 82 in the direction of the half mirror layer 15 and the external image.

Among the video light GL which is propagated in the light guide member 10 and enters the second surface S12, light which is not reflected on the half mirror layer 15 enters the light transmission member 50. However, the light is prevented from being returned to the light guide member 10 by an antireflection portion (not shown) provided in a peripheral portion or the like on the side of the frame 61 in the light transmission member 50. That is, the video light GL passing through the second surface S12 is prevented from being returned onto the optical path and being thus stray light. In addition, the external light HL which enters from the side of the light transmission member 50 and is reflected on the half mirror layer 15 is returned to the light transmission member 50, and is prevented from being emitted to the light guide member 10 by the antireflection portion provided in the light transmission member 50. That is, the external light HL which is reflected on the half mirror layer 15 is prevented from being returned onto the optical path and being thus stray light.

However, in the case of providing a see-through function as in the virtual image display device 100, stray light may be generated due to not only the video light GL, but also the external light HL as described above and there is thus a high possibility that ghost light may be generated with stray light components, and thus a countermeasure for ghosting is more important. For example, the generation of stray light may not be sufficiently prevented only by the removal of unnecessary light components among video light generated by the light-shielding portion BP shown in FIG. 2A and the prevention of reflected light by the antireflection portion of the light transmission member 50. Particularly, under the circumstance where the device has a form similar to glasses and is reduced in size as described above, ghost light may be generated by, for example, a slight optical path deviation which is caused by an error of the product. Regarding this, in this embodiment, the generation of unnecessary light by unintended reflection or scattering is suppressed by providing a peripheral area forming portion EP around an effective light flux guide portion DP in which an effective light flux is guided in the light guide member 10, thereby avoiding the generation of ghost light.

Hereinafter, a position where the peripheral area forming portion EP is to be formed with respect to the effective light flux guide portion DP in the light guide member 10 will be described with reference to FIG. 2B and the like. First, the effective light flux guide portion DP means a portion (range) through which effective components of the video light GL (see FIG. 2A), that is, components which reach the eye EY of the observer pass in the light guide member 10. The peripheral area forming portion EP means a portion which forms the periphery of the effective light flux guide portion DP in the light guide member 10, and corresponds to the wall portions WP1 and WP2 which are formed around the fourth surface S14 in FIG. 2B. The effective light flux guide portion DP includes a surface which contributes to the guiding of the video light GL and has an optical function as in the case of the first surface S11. The peripheral area forming portion EP includes an expanded surface provided by extending the optical functional surface such as the first surface S11. For example, in one example shown in FIG. 2B, the expanded surfaces ES1 and ES2 of the fourth surface S14 which is a part of the effective light flux guide portion DP are formed by the wall portions WP1 and WP2 which are a part of the peripheral area forming portion EP. In other words, the expanded surfaces ES1 and ES2 which are provided so that the fourth surface S14 extends are formed to be enlarged in the vertical direction (the Y direction in the drawing) of the fourth surface S14, respectively, with the wall portions WP1 and WP2 which are a part of the peripheral area forming portion EP. The expanded surfaces ES1 and 352 are present as surfaces smoothly connected to and extending from the fourth surface S14 which is an effective light flux guide surface DP1; in other words, the expanded surfaces ES1 and ES2 are continuous surfaces peripherally continuously extending from the fourth surface S14, and thus for example, when the video light GL enters the fourth surface S14, the light out of the range of the fourth surface S14 is allowed to pass and to be separated from the effective light flux guide portion DP, and is thus guided in a direction in which it departs from a range which can be visually recognized by the observer. The above-described wall portions WP1 and WP2 which become walls are formed around the effective light flux guide portion DP, and thus unintended light reflection or scattering occurs around the fourth surface S14 which is a passing area of the light flux of the video light GL, whereby the generation of ghost light is suppressed.

Figure 3A:
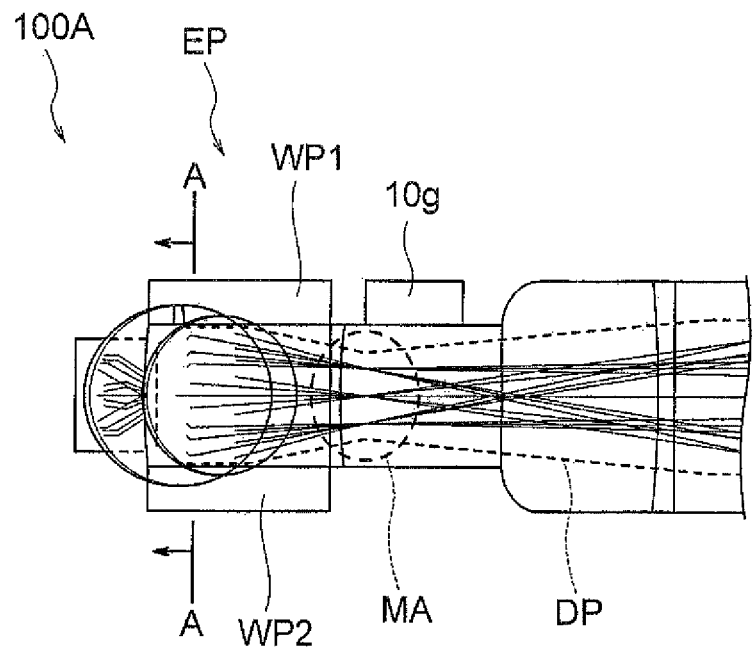
FIG. 3A is a diagram showing an aspect of an effective light flux in the front view of the main body portion.
Figure 3B:
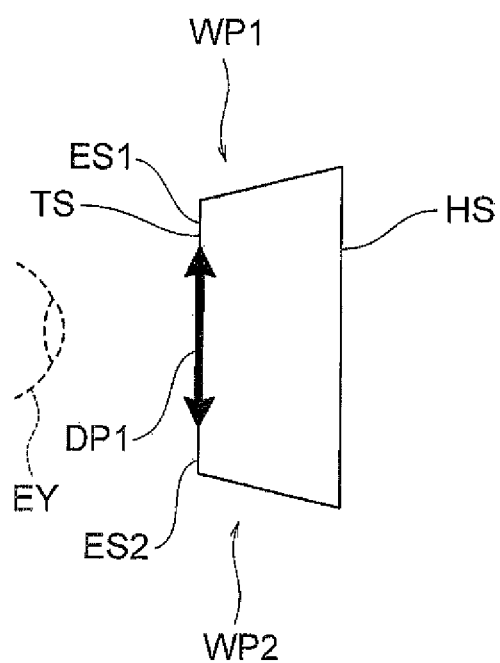
FIG. 3B is a schematic cross-sectional view of the main body portion.

Here, FIG. 3A is a diagram showing an example of a passing range of the effective light flux, i.e., an aspect of the effective light flux guide portion DP in the front view of the main body portion. FIG. 3B is a diagram schematically showing a cross-section taken along the line A-A of FIG. 3A. As shown in FIG. 3A, the effective light flux guide portion DP is a range which is formed by the whole light flux of the effective components of the video light GL in the light guide member 10. In other words, an envelope (enveloping surface) which is formed by the whole light flux rays constituting the video light GL becomes a boundary between the effective light flux guide portion DP and the peripheral area forming portion EP. Around an area MA which is a portion in which an intermediate image is formed or a portion therearound in the effective light flux guide portion DP, the passing range of the effective light flux of the video light GL, that is, the shape of the effective light flux guide portion DP is constricted and narrowed. It is thought that using this, the peripheral area forming portion EP which is formed around the area MA is reduced in the light guide member 10, and thus it is possible to improve the design of the whole virtual image display device 100 and to reduce the device in size. However, the area MA is a portion in which an intermediate image of video light is formed and is a portion in which the effective light flux components are collected. Accordingly, for example, when the light guide member 10 has a scratch or the like in and around the area MA, the scratch has a great influence on the image. Similarly, when ghosting occurs in and around the area MA, it becomes highly conspicuous. In this embodiment, the peripheral area forming portion EP has a sufficiently large size around the area MA, that is, ahead of and behind a portion in which an intermediate image is formed, thereby suppressing the occurrence of ghosting.

Particularly, as shown in FIG. 3A and the like, when the effective light flux guide portion DP like a light guide system of a polyhedral prism in which expansion and convergence of the whole light flux rays of the effective light flux alternately occur a plurality of times with respect to the light guide member 10 has a complicated shape, it is necessary to sufficiently secure an optical path not only in an incidence position and an emission position of the light flux with respect to the light guide member 10, but also in an intermediate position thereof, in order to prevent the generation of stray light and to thus implement a sufficient countermeasure for ghosting. Therefore, in this embodiment, the peripheral area forming portion EP is formed particularly adjacent to a portion in the vicinity of a portion in which there is a high possibility that ghosting may occur and in which an intermediate image is formed in the effective light flux guide portion DP. That is, in the light guide member 10, the expanded surface ES1 and the like have a sufficiently large size in a portion positioned ahead of and behind the intermediate image in the peripheral area forming portion EP, thereby suppressing the incidence of unintended unnecessary light to the eye through the reflection/passage on/through a surface therebehind in the portion in which an intermediate image is formed in the effective light flux guide portion DP and therearound. Thus, the generation of easily-recognizable ghost light is avoided.

In the case of the embodiment, since an intermediate image is formed in the light guide member 10 through the projection lens 30 and the like and the video light GL totally reflected on two or more surfaces in order of the third surface S13, the first surface S11, and the second surface S12 passes through the first surface S11 and reaches the eye EY of the observer, it is possible to reduce the whole optical system in size and weight by making the light guide member 10 thinner and to realize the bright, high-performance display with a large angle of view. In addition, since the external light HL can be observed after passing through the first surface S11 and the third surface S13, and at this time, the diopter is approximately 0, it is possible to reduce defocusing and distortion of the external light HL when observing the external light HL in a see-through manner. In addition, the light guide member 10 has such a shape as to be along the face of the observer and the center of gravity is close to the observer, whereby an excellent design can be obtained.

In addition, as shown in FIG. 3B, in the light guide member 10, a surface HS which forms a front side and becomes the outside of the virtual image display device when viewed from the observer upon wearing is wider than a surface TS which forms a rear side. When such a shape is formed, the shape is easily matched with the face of the observer, whereby an excellent design can be obtained.

Hereinafter, a process for unnecessary light in the virtual image display device according to this embodiment will be described. In the above, the countermeasure for ghosting in the vicinity of the portion which forms an intermediate image, in which the light flux of the video light is converged, has been described, but the position where ghosting occurs is not limited to such a position, and for example, ghosting may also occur in a portion which does not contribute to the guiding of the effective light flux components of the video light, such as a side surface forming portion of the light guide member. It is thought that in the portion which does not contribute to the guiding, ghosting may occur by reflection or scattering of unnecessary components in the video light or external light components. In this embodiment, even when unintended reflection or scattering occurs in the side surface forming portion and the like of the light guide member, ghosting is not recognized without reaching the eye of the observer.

Figure 4A:
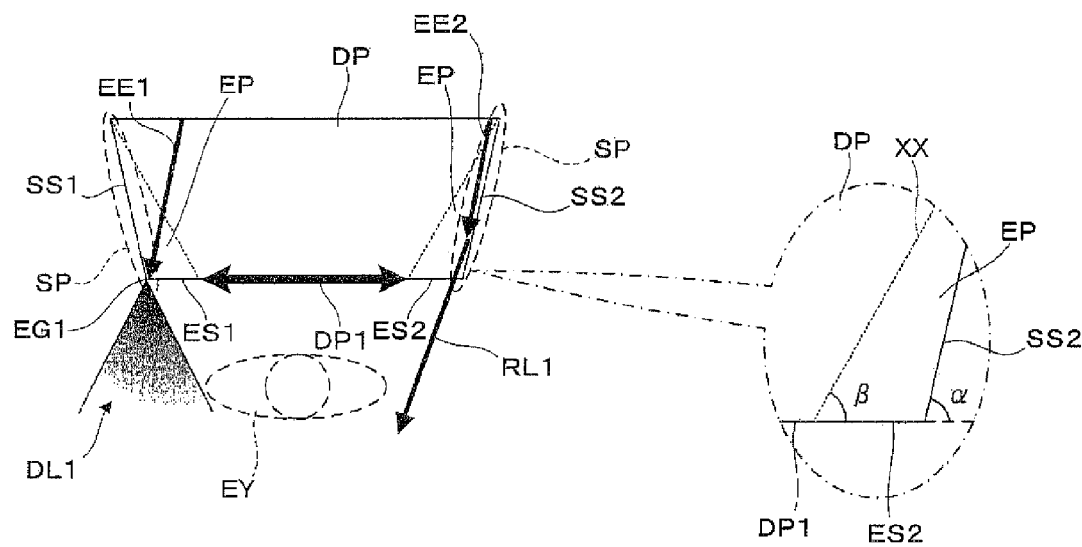
FIG. 4A is a schematic diagram for illustrating an optical path of unnecessary light.
Figures 4B, 4C:
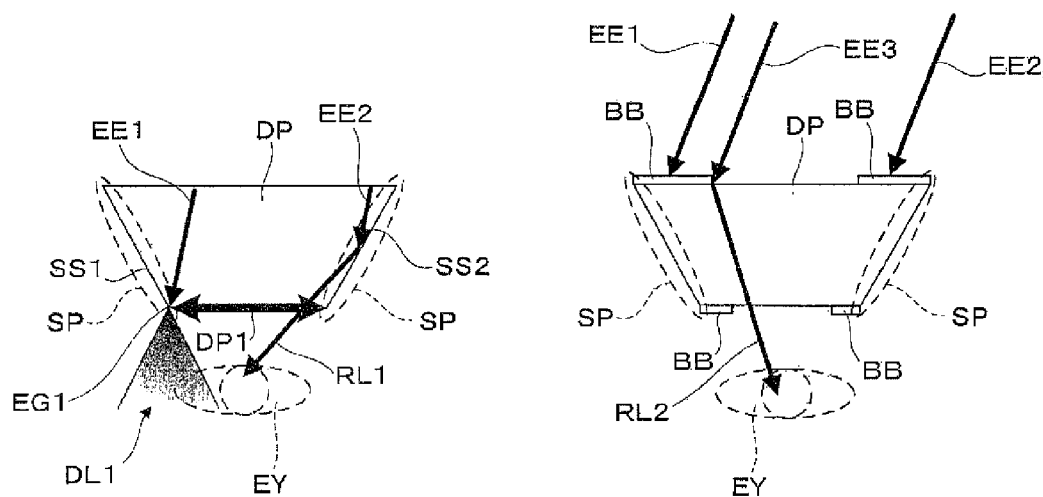
FIG. 4B is a diagram of a comparative example.
FIG. 4C is a diagram of another comparative example.

FIG. 4A is a diagram corresponding to FIG. 3B and is a schematic diagram for illustrating a process for unnecessary light by the virtual image display device 100 of this embodiment. FIGS. 4B and 4C are diagrams of comparative examples. FIG. 4A and the like show, in common with FIG. 3B, the light guide member 10 having a trapezoidal cross-sectional shape, but are diagrams schematically showing aspects of cross-sections at various positions in the light guide member 10. FIG. 4A and the like are different from FIG. 3B in terms of the fact that the respective portions are not necessarily accurately shown. First, in FIG. 4A, in the light guide member 10, the effective light flux guide portion DP has a trapezoidal shape in a cross-sectional view and is formed on the central side, and the peripheral area forming portion EP which is formed on the peripheral side of the effective light flux guide portion DP has a triangle shape in a cross-sectional view. In addition, regarding a surface which is opposed to the eye EY among the surfaces which are shown to form the trapezoidal shape, a range of the effective light flux guide surface DP1 of the effective light flux guide portion DP, which contributes to the guiding of the effective light flux, is expressed by the two-way arrow. Surfaces which are provided by extension from the effective light flux guide surface DP1 and form the surface of the peripheral area forming portion EP are expanded surfaces ES1 and ES2 similarly to the foregoing case. It can be grasped that the above-described effective light flux guide surface DP1 and expanded surfaces ES1 and ES2 shown in FIG. 4A represent the fourth surface S14 and expanded surfaces provided by extending the fourth surface S14, similarly to the case of FIG. 3B. However, in FIG. 4A, the structure is not limited thereto, and for example, it can also be grasped that the effective light flux guide surface DP1 is the first surface S11 and the expanded surfaces ES1 and ES2 represent expanded surfaces provided by extending the first surface S11. As described above, FIG. 4A schematically shows the effective light flux guide surface DP1 and the expanded surfaces ES1 and ES2, and also represents a case in which the surfaces are not disposed just near the eye EY as in FIG. 3B, surfaces which are disposed just near the eye EY differently from FIG. 3B, or various surfaces constituting the effective light flux guide portion DP. In any case, it is important to provide a structure adapted in a manner such that unnecessary light does not reach the eye EY finally.

In addition, in FIG. 4A, surfaces which intersect the expanded surfaces ES1 and ES2 and do not contribute to the guiding of the video light GL are side surfaces (side surface areas) SS1 and SS2. A portion including the side surface areas such as the side surfaces SS1 and SS2 is a side surface forming portion SP. As shown in the drawing, the peripheral area forming portion EP is formed to be interposed between the effective light flux guide portion DP and the side surface forming portion SP.

The side surfaces SS1 and SS2 which form the surface of the side surface forming portion SF are a part of the plurality of surfaces constituting the light guide member 10, and correspond to the first side surface 10e and the second side surface 10f in FIG. 23. However, the side surfaces SS1 and SS2 are also not limited to the side surfaces 10e and 10f, and represent various surfaces which are surfaces constituting the light guide member 10 and do not contribute to the guiding of the video light GL.

Hereinafter, the process for unnecessary light in the light guide member 10 shown in FIG. 4A will be described. As unnecessary light components which are not visually recognized among components resulting from the video light and the external light, for example, components which pass through a boundary portion EG1 between the expanded surface ES1 and the side surface SS1 as in the case of an unnecessary light component EE1 are diffused to generate diffused light DL1 in the boundary portion EG1. This is due to the fact that the boundary portion EG1 is, for example, an area having a minute curved surface portion. If components of the diffused light DL1 reach the eye EY of the observer, it is recognized as ghost light. Regarding this, in this embodiment, the expanded surface ES1 is formed to have a sufficiently large size so that the diffused light DL1 does not reach the eye EY. In addition, as unnecessary light components, for example, components which are reflected on the side surface SS2 as in the case of an unnecessary light component EE2 are also considered. Particularly, in the case of components which enter at a very small angle with respect to the side surface SS2 as shown in the drawing, most components are reflected, and thus when the reflected light RL1 reaches the eye EY, it is easily recognized as ghost light. In this embodiment, the peripheral area forming portion EP of a sufficiently large size is provided to be interposed between the effective light flux guide portion DP and the side surface forming portion SP, whereby components such as the reflected light RL1 which may be ghost light do not reach the eye EY.

As in the case of the comparative example shown in FIG. 4B, when the peripheral area forming portion EP is not provided, that is, when the peripheral area forming portion EP and the expanded surface ES1 and the like which are formed therefrom are not present, the diffused light DL1 may be visually recognized as ghost light when components which pass through the boundary portion EG1 between the effective light flux guide surface DP1 and the side surface SS1 as in the case of the unnecessary light component EE1 are diffused in the boundary portion EG1. In addition, the reflected light RL1, which is a component which enters and is reflected at a small angle with respect to the side surface as in the case of the unnecessary light component EE2, may also reach the eye EY because there is no buffer portion such as the peripheral area forming portion EP of FIG. 4A. In addition, as in the case of another comparative example shown in FIG. 4C, when a light-shielding member BB is provided, reflected light RL2 which becomes a cause of the occurrence of ghosting may be generated due to the reflection of components from the external world on a side surface of the light-shielding member BB as in the case of an unnecessary light component EE3, although components which are appropriately shielded, such as the unnecessary light components EE1 and EE2 from the external world exemplified in the drawing, are also present. In addition, although omitted in the drawing, the light-shielding member BB may partially shield the effective light flux of the video light in accordance with a position where the light-shielding member BB is provided. Particularly, it is thought that in a see-through mode, it is necessary to pass not only the video light but also the external light, but the light-shielding member BB may block the external light.

Figure 5A:
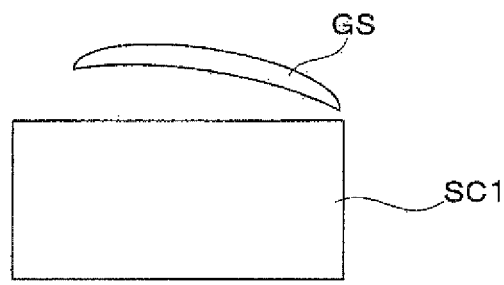
FIG. 5A is a diagram showing an aspect of ghost light which is visually recognized in the case of the comparative example.
Figure 5B:
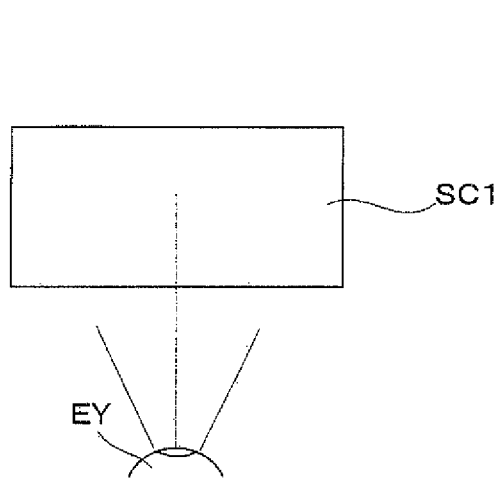
FIG. 5C is a diagram showing an aspect in which the ghost light is visually recognized by changing the direction of eyes from the state of FIG. 5B.
Figure 5C:
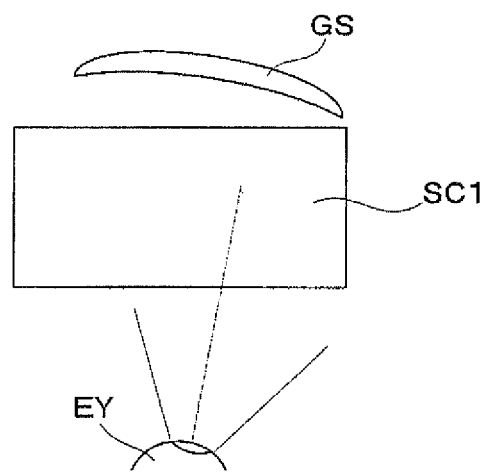

Regarding the state where ghosting occurs in the above comparative examples, for example, as shown in FIG. 5A, a ghost image GS which is formed into a crescent shape is generated in a visually-recognizable range which is outside a video range SC1 to be visually recognized. Regarding the way that the ghost image GS appears, it may be always visually recognized. Otherwise, as shown in FIG. 5B, the ghost image GS may not be visually recognized in a state where the eye EY of the observer looks forward toward the center of the video range SC1, but as shown in FIG. 5C, the ghost image GS may be visually recognized by changing the direction of the eye from the state of FIG. 5B. Particularly, such a situation easily occurs because it is thought that the observer moves the direction of eyes to see the external world in a see-through mode. In this embodiment, the peripheral area forming portion EP is formed to have a sufficiently large size and shape if necessary, and thus even when unnecessary light is generated by reflection or diffusion, components thereof cannot be allowed to reach the eye EY of the observer. Furthermore, a state where ghosting does not occur can be maintained in consideration of a case in which the observer changes the posture of the eye EY. As another way to form the peripheral area forming portion EP, the angle of the side surface SS2 (SS1) with respect to the effective light flux guide surface DP1 and the expanded surface ES2 (ES1) may be changed (the surface may be raised) to form the peripheral area forming portion EP as shown in the partial enlarged view in FIG. 4A. That is, it can also be grasped that when the side surface SS2 (SS1) is formed so that an angle $\beta$ of a virtual surface XX with respect to the effective light flux guide surface DP1 when the peripheral area forming portion EP is not present is increased to an angle $\alpha$, the occurrence of ghosting is suppressed.

As described above, in the virtual image display device 100 of this embodiment, the light guide member 10 which guides video light includes the peripheral area forming portion EP extending to the outside of the effective light flux guide portion DP which is an area through which the effective light flux of the video light passes, and thus even when ghost light resulting from components generated by unintended reflection or scattering in a position such as the side surface forming portion SP of the light guide member 10 may be generated, the side surface forming portion SP can be separated from the effective light flux guide portion DP. Accordingly, an appropriate countermeasure for ghosting can be implemented even under the circumstance where the video light and the external light are visually recognized at the same time and ghost light is thus easily generated, and thus good video light can be visually recognized and a good external image can also be recognized. Accordingly, even when unintended reflection or scattering occurs, it occurs at a position separated from the effective light flux guide surface DP1, and thus the reflected or scattered light is eliminated without entering the effective light flux guide surface DP1 or becoming ghost light.

Figure 6A:
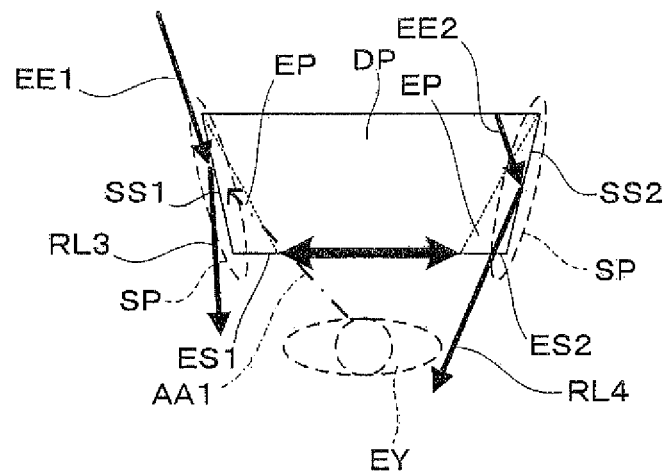
FIG. 6A is a schematic diagram for illustrating a modification example of the virtual image display device.
Figure 6B:
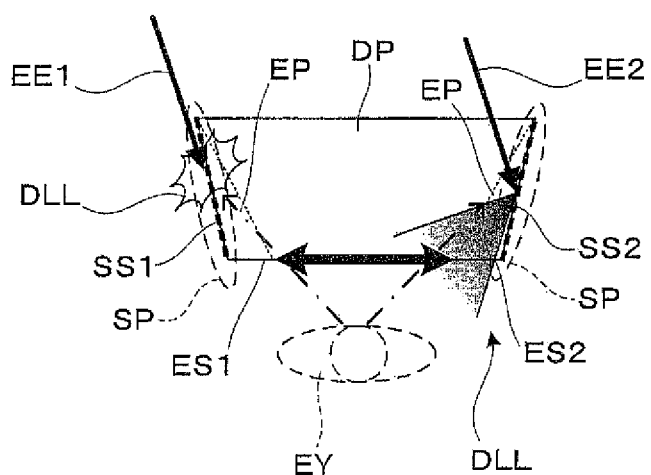
FIG. 6B is a diagram of a comparative example.

Hereinafter, a modification example of the virtual image display device will be described. FIG. 6A is a schematic diagram for illustrating a modification example of the virtual image display device. FIG. 6B is a diagram of a comparative example. In this modification example, the light guide member 10 employs a structure similar to FIG. 4A and the side surfaces SS1 and SS2 of the side surface forming portion SP are glossy surfaces. More specifically, the side surfaces SS1 and SS2 may be coated with a hard coating layer, similarly to the first surface S11 and the like which are other surfaces. When the side surfaces SS1 and SS2 are formed to be smoothed by hard coating, the roughness of the surface can be adjusted so that a maximum valley depth Pv of a cross-sectional curve is 50 μm or less and a center line average roughness Ra is 5 μm or less. In this case, for example, the unnecessary light component EE1 is reflected without being diffused on the side surface SS1. Therefore, for example, reflected light RL3 which is generated by reflection of the unnecessary light component EE1, which is external light in the drawing, on the side surface SS1 does not reach the eye EY. In this case, as shown by the arrow AA1, even when the observer turns his or her eyes to the side surface SS1, it appears dark with no recognition of ghosting or the like by the unnecessary light component EE1. In addition, for example, the unnecessary light component EE2 is reflected on the side surface SS2 and reflected light RL4 is thus generated, but the unnecessary light component EE2 is not diffused. Accordingly, when the peripheral area forming portion EP is provided to have a sufficiently large size, the reflected light RL4 cannot be allowed to reach the eye EY. On the other hand, as shown in the comparative example shown in FIG. 6B, when the side surfaces SS1 and SS2 are, for example, surfaces subjected to an embossing process, a component DLL diffused with a certain degree of spread is generated after the unnecessary light component EE1 or the unnecessary light component EE2 enters the side surface SS1 or SS2, and thus this component reaches the eye EY and may be recognized as ghost light.

In this modification example, not only the surfaces such as the effective light flux guide surface DP1 which guides the video light, but also the side surfaces SS1 and SS2 are provided as smoothed surfaces by hard coating or the like to suppress light diffusion, thereby reducing the occurrence of ghosting.

Second Embodiment

Hereinafter, a virtual image display device according to a second embodiment will be described. Since the virtual image display device according to this embodiment is a modification example of the virtual image display device 100 according to the first embodiment, the description of the entire device and the respective portions thereof will be omitted.

Figure 7A:
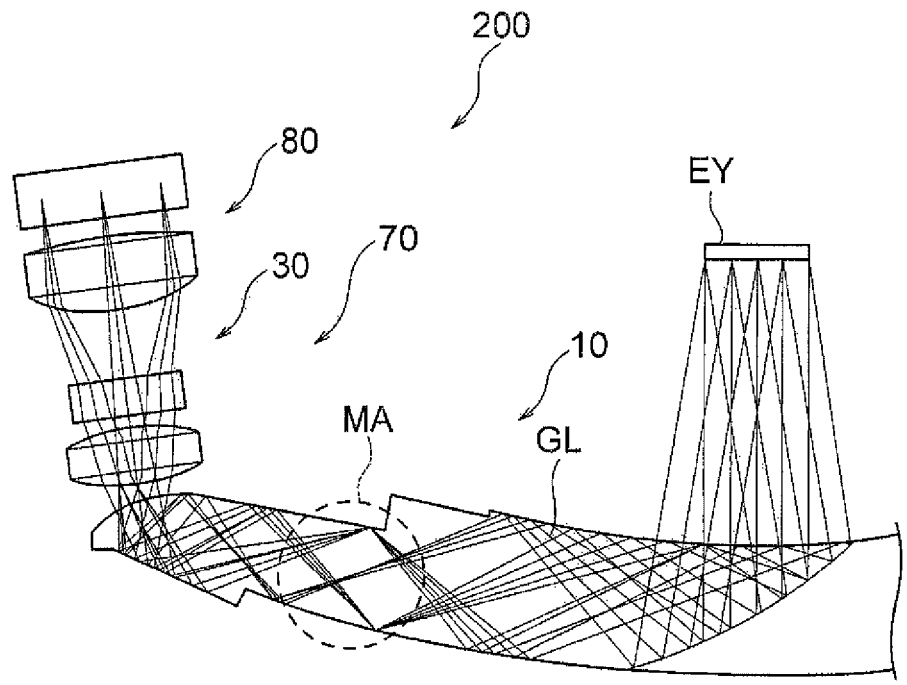
FIG. 7A is a diagram showing an aspect of a light flux in a plan view of a main body portion of a virtual image display device according to a second embodiment.
Figure 7B:
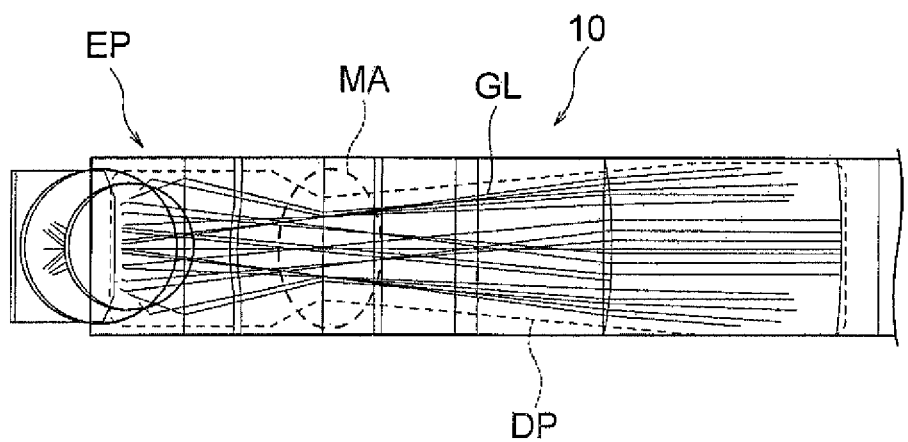
FIG. 7B is a diagram showing an aspect of a light flux in a front view of the main body portion.

FIG. 7A is a diagram showing an example of a passing range of an effective light flux, i.e., an aspect of an effective light flux guide portion DP in the plan view of the main body portion of a virtual image display device 200 according to this embodiment. FIG. 7B is a diagram showing an aspect of the effective light flux in the front view of the main body portion.

This embodiment is different from the first embodiment (see FIG. 2B or 3A) in terms of the fact that an approximately constant thickness is maintained without formation of a constricted portion in a light guide member 10 around an area MA which is in the vicinity of a portion in which an intermediate image is formed. In the case of this embodiment, a peripheral area forming portion EP is also provided as a portion extending to the outside of an effective light flux guide portion DP, and thus an appropriate countermeasure for ghosting can be implemented and not only a good video light but also a good external image can be recognized.

Third Embodiment

Hereinafter, a virtual image display device according to a third embodiment will be described. Since the virtual image display device according to this embodiment is a modification example of the virtual image display device 100 according to the first embodiment, the description of the entire device and the respective portions thereof will be omitted.

Figure 8A:
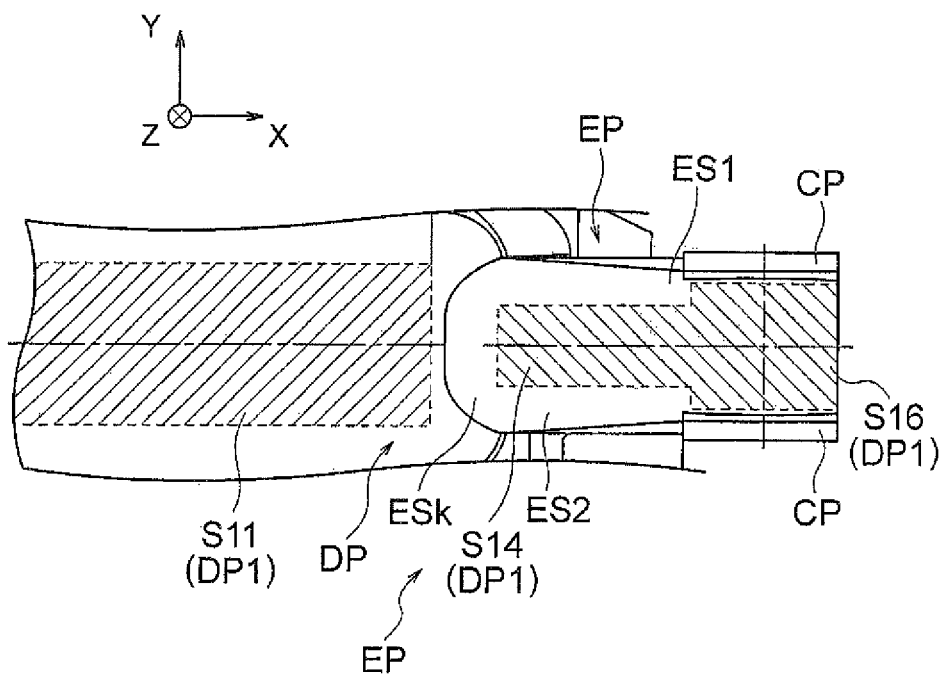
FIG. 8A is a diagram showing an aspect of a light guide member of a virtual image display device according to a third embodiment viewed from an observer.
Figure 8B:
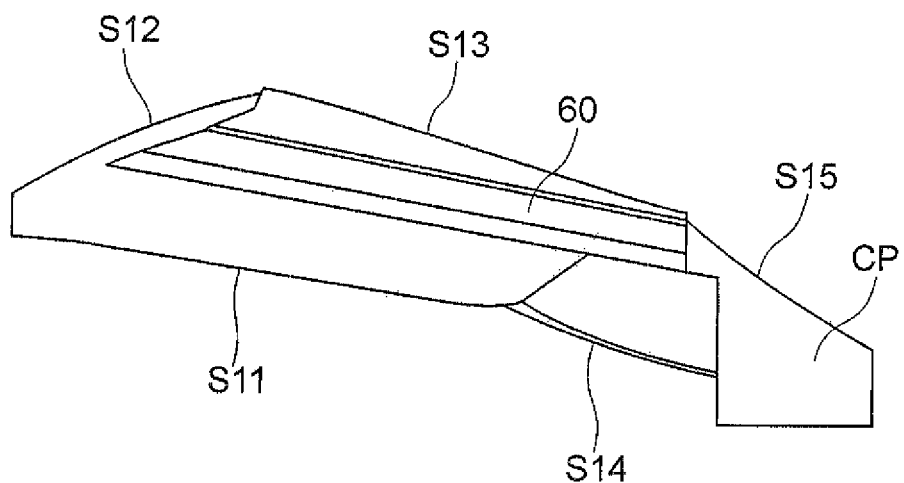
FIG. 8B is a diagram showing the light guide member when viewed from above.
Figure 9:
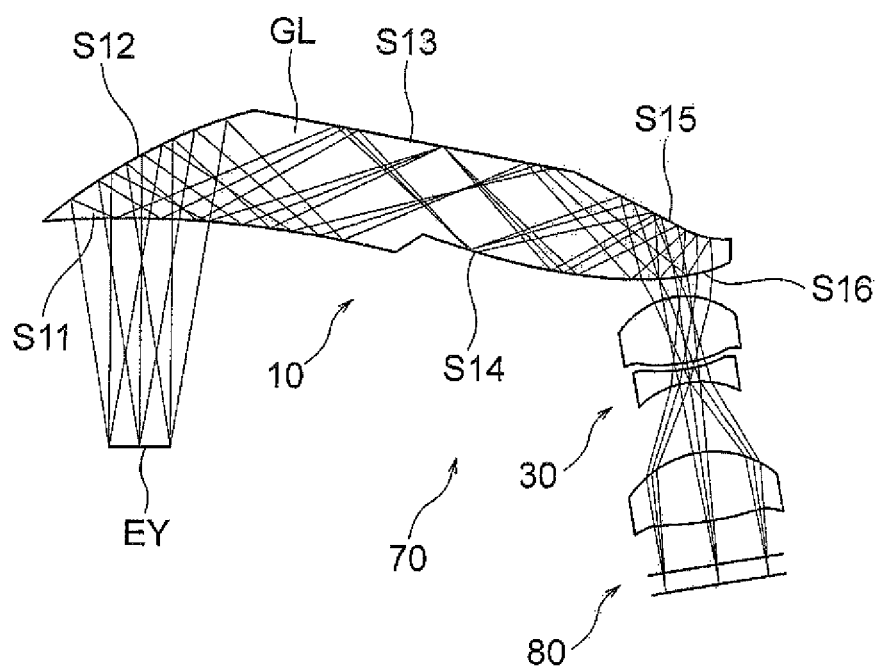
FIG. 9 is a diagram showing an example with regard to an optical path in the virtual image display device.

FIG. 8A is a diagram showing an aspect of a light guide member 10 of the virtual image display device according to this embodiment when viewed from the rear side, that is, from the observer. FIG. 8B is a diagram showing the light guide member 10 when viewed from above. FIG. 9 is a diagram showing an example with regard to an optical path in the virtual image display device using the light guide member 10 of FIGS. 8A and 8B. As shown in FIGS. 8A, 8B and the like, this embodiment is different from the embodiments in terms of the fact that a peripheral area forming portion EP is provided not only in a vertical direction, i.e., the Y direction, but also in a horizontal direction, i.e. the X direction. Hereinafter, the peripheral area forming portion EP and the like will be described in detail. First, in FIG. 8A, a shaded portion is an effective light flux guide surface DP1 of an effective light flux guide portion DP, that is, a first surface S11, a fourth surface S14, or the like, and an expanded surface of the peripheral area forming portion EP is formed therearound. Here, the expanded surface of the peripheral area forming portion EP is shown particularly around the fourth surface S14 which is a part of the effective light flux guide surface DP1. Specifically, the peripheral area forming portion EP has expanded surfaces ES1 and ES2 which are continuous surfaces provided by continuously extending (expanding) the fourth surface S14 in the Y direction, and an expanded surface ESk which is a continuous surface provided by continuous extension (expansion) in the X direction (in the drawing, −X side) along the light guide direction. That is, the expanded surfaces are provided to have a sufficiently large size not only in the Y direction perpendicular to the light guide direction, but also in the X direction. Accordingly, in guiding of the video light in the light guide member 10, unnecessary light components which may be generated in various directions, including components in the X direction, Y direction, or the two-way direction thereof, can be processed.

In the drawing, a connection portion OP provided on the proximal side of the light guide member 10 is an engaging portion which allows posture alignment by locking using the engagement between the light guide member 10 and the projection lens 30 (see FIG. 2A). A rib 60 is a portion for attaching the light guide member 10 along the frame 61 (see FIG. 2B).

In the case of this embodiment, the peripheral area forming portion EP is also provided to have a sufficiently large size to appropriately implement the countermeasure for ghosting, and thus good video light can be visually recognized and a good external image can also be recognized. Particularly, in the case of this embodiment, unnecessary light components which are generated in various directions can be processed. In the above description, as the effective light flux guide surface DP1, the fourth surface S14 is used as a target, and the expanded surface ESk is provided by extension from the fourth surface S14 toward the −X side. However, a case in which the effective light flux guide surface DP1 is provided as an expanded surface other than the fourth surface S14 is also considered, and the extension direction is not limited to the −X direction and the extension in the +X direction is also possible.

Others

The invention has been described based on the respective embodiment, but is not limited to the above-described embodiments, and may be realized in various forms in a range without departing from the scope of the invention. For example, the following modifications may be employed.

In the above, the roughness of the expanded surface ES1 and the like among the surfaces constituting the light guide member 10 can be adjusted to be greater than that of the effective light flux guide surface. In general, the effective light flux guide surface DP1 is required to have a higher surface accuracy (for example, maximum valley depth Pv of cross-sectional curve: 10 um or less). An expanded surface out of the effective range may have a relatively low surface accuracy (for example, Pv: 50 um or less) if unnecessary light is appropriately processed. In this case, it is not required to adjust the roughness of the expanded surface as strictly as the roughness of the effective light flux guide surface, and thus a mold for molding the main body portion 10s of the light guide member 10 can be relatively easily produced.

In the above description, the half mirror layer (semi-transmissive reflective film) 15 is formed in the horizontally long rectangular area, but a contour of the half mirror layer 15 may be appropriately changed according to other uses. Further, the transmittance or reflectance of the half mirror layer 15 may also be changed according to other uses.

In the above description, distribution of display luminance in the video display element 82 is not particularly adjusted, but in a case in which a luminance difference occurs according to positions, for example, it is possible to unevenly adjust the distribution of display luminance.

In the above description, the video display element 82 including a transmissive liquid crystal display device or the like is used as the image display device 80. However, the image display device 80 is not limited to the video display element 82 including a transmissive liquid crystal display device or the like, and various devices can be used. For example, it is possible to use a configuration using a reflective liquid crystal display device and to use a digital micro-mirror device or the like instead of the video display element 82 including the liquid crystal display device or the like. Furthermore, it is also possible to use a light emitting element represented by an LED array, an OLED (organic EL) or the like, as the image display device 80.

In the above embodiments, the image display device 80 including the transmissive liquid crystal display device or the like is used, but instead, a scanning image display device can also be used.

In the above description, the virtual image display device 100 including a pair of display devices 100A and 100B has been described, but a single display device may be used. That is, a configuration may be employed in which the projection/see-through device 70 and the image display device 80 are not provided as a set corresponding to both of the right eye and the left eye, and the projection/see-through device 70 and the image display device 80 are provided with respect to only one of the right eye and the left eye to view the image with a single eye.

In the above description, the interval between the pair of display devices 100A and 100E in the X direction has not been described, but the interval between the display devices 100A and 100B is not limited to being fixed, and can be adjusted by a mechanical mechanism or the like. That is, the interval between the display devices 100A and 100B in the X direction can be adjusted according to an eye width of the wearer.

In the above description, the half mirror layer 15 is a simple semitransparent film (for example, metal reflective film or dielectric multilayer film), but the half mirror layer 15 can be replaced by a flat or curved hologram element.

In the above description, the virtual image display device 100 has been specifically explained as a head-mounted display, but the virtual image display device 100 may be modified into a head-up display.

In the above description, the video light is totally reflected by an interface with air without providing a mirror, a half mirror or the like on the surfaces of the first surface S11 and the third surface S13 of the light guide member 10, but the total reflection in the virtual image display device 100 according to the invention includes reflection occurring by a mirror coating or a half mirror film formed on the whole or a part of the first surface S11 or the third surface S13. For example, a case in which in a state in which the incident angle of image light satisfies the total reflection condition, mirror coating or the like is performed on the whole or a part of the first surface S11 or the third surface S13 to reflect substantially the entire image light is also included. In addition, the whole or a part of the first surface S11 or the third surface S13 may be coated with a mirror having slight permeability if it can obtain sufficiently bright image light.

In the above description, the light guide member 10 or the like extends in the horizontal direction in which the eyes EY are arranged, but the light guide member 10 may be disposed to extend in the vertical direction. In this case, the optical member 110 has a structure of being arranged in parallel, not in series.

The entire disclosure of Japanese Patent Application No. 2013-041587, filed Mar. 4, 2013 is expressly incorporated by reference herein.

What is claimed is:

1. A virtual image display device which allows video light and external light to be visually recognized at the same time, comprising:
    a video element which generates video light; and
    a light guide member which has a plurality of surfaces and guides the video light from the video element through reflection and transmission on the plurality of surfaces,
    wherein the light guide member comprises:
        an effective light flux guide portion which guides effective light flux components which reach an observer as the video light from the video element,
        a shape of the effective light flux guide portion being constricted and narrowed in an intermediate portion of the effective light flux guide portion, such that portions of the effective light flux guide portion that are positioned before and after the intermediate portion are wider than the intermediate portion; and
        a peripheral area forming portion which is formed around the effective light flux guide portion,
    the effective light flux guide portion having an effective light flux guide surface which guides video light, and
    the peripheral area forming portion having an expanded surface provided to enlarge the effective light flux guide surface, and
    the peripheral area forming portion including, as the expanded surface, a surface where the effective light flux guide surface is enlarged in a light guide direction, such that an entirety of an outer periphery of the expanded surface is not in parallel to an outer periphery of the effective light flux guide surface.

2. The virtual image display device according to claim 1, wherein the light guide member is a prism-type member which guides the video light from the video element and allows the external light to pass therethrough.

3. The virtual image display device according to claim 1, wherein the peripheral area forming portion allows unnecessary incident light to pass therethrough and guides the light in a direction in which it departs from a range which can be visually recognized by the observer.

4. The virtual image display device according to claim 1, wherein in the peripheral area forming portion, the expanded surface is a continuous surface peripherally continuously extending from the effective light flux guide surface.

5. The virtual image display device according to claim 1, wherein among the surfaces constituting the light guide member, the expanded surface has a greater roughness than that of the effective light flux guide surface.

6. The virtual image display device according to claim 1, wherein the light guide member has a side surface forming portion which forms a side surface area which is a part of the plurality of surfaces and does not contribute to guiding of video light, and
    wherein the peripheral area forming portion is formed to be interposed between the effective light flux guide portion and the side surface forming portion.

7. The virtual image display device according to claim 6, wherein in the light guide member, the side surface area of the side surface forming portion is constituted by a glossy surface.

8. The virtual image display device according to claim 6, wherein in the light guide member, a surface including the side surface area of the side surface forming portion is formed to be smoothed by hard coating.

9. The virtual image display device according to claim 1,
wherein the light guide member has such a surface roughness that a maximum valley depth of a cross-sectional curve is 50 μm or less and a center line average roughness is 5 μm or less.

10. The virtual image display device according to claim 1,
wherein the light guide member includes three or more non-axisymmetric curved surfaces and allows an intermediate image to be formed in the effective light flux guide portion as a part of the optical system which guides video light.

11. The virtual image display device according to claim 10,
wherein the peripheral area forming portion is provided around a portion in which an intermediate image is formed at least in the effective light flux guide portion.

12. The virtual image display device according to claim 1,
wherein in the light guide member, when external light is visually recognized after passing a first surface and a third surface among the plurality of surfaces, the diopter is approximately zero,
wherein the first surface and the third surface form a concave shape with respect to an observation side, and
wherein the video light from the video element is totally reflected on the third surface, totally reflected on the first surface, and reflected on a second surface, and then passes through the first surface to reach the observation side.

13. The virtual image display device according to claim 12,
wherein the light guide member has a fourth surface which is disposed adjacent to a light incidence side of the first surface and guides video light incident thereinto to the third surface, a fifth surface which is disposed adjacent to a light incidence side of the third surface and guides video light incident thereinto to the fourth surface, and a sixth surface which allows the video light from the video element to be incident thereinto and guides the light to the fifth surface,
wherein the fourth surface is a reflective surface which extends into a convex shape in the light guide direction from the sixth surface, and is a surface which totally reflects the light reflected on the fifth surface to the inside of the light guide portion through total reflection, and
wherein the peripheral area forming portion is provided around the fourth surface.

14. The virtual image display device according to claim 1,
wherein in the light guide member, a surface which forms a front side of the device among the plurality of surfaces is wider than a surface which forms a rear side.

\* \* \* \* \*